UNITED STATES PATENT OFFICE.

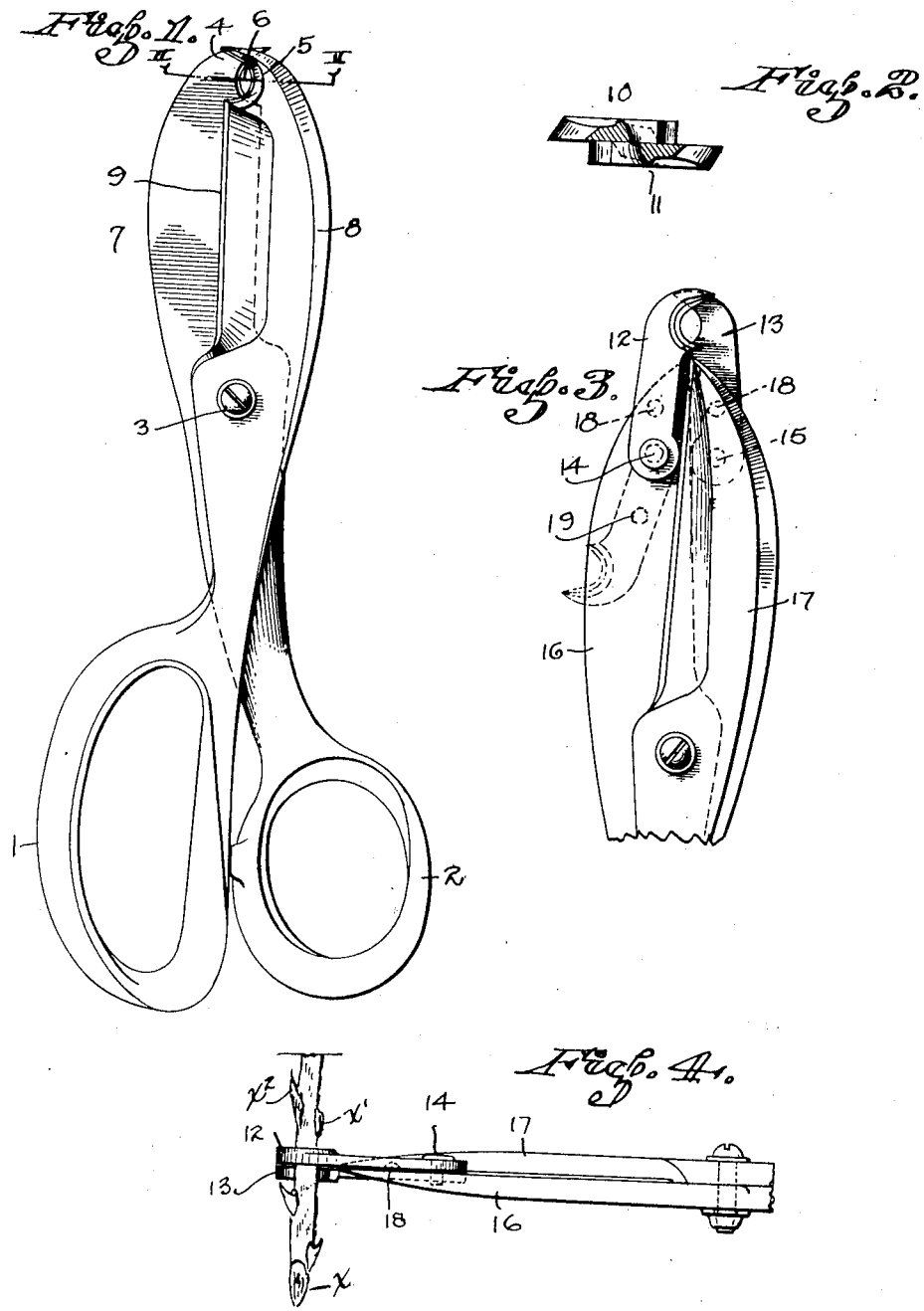

FREDERIC J. BERTRAND, OF SAN FRANCISCO, CALIFORNIA.

FLOWER SHEARS AND STRIPPER.

1,322,085.

Specification of Letters Patent.  Patented Nov. 18, 1919.

Application filed August 27, 1917. Serial No. 188,376.

*To all whom it may concern:*

Be it known that I, FREDERIC J. BERTRAND, a citizen of the United States, and a resident of the city and county of San Francisco, State of California, have made a new and useful Improvement in Flower Shears and Strippers; and I do hereby declare the following to be a full, clear, concise, and exact description of the same.

The invention relates particularly to instruments for removing thorns from the stems of roses and other flowers.

Among the objects of this invention are to produce a convenient means for removing thorns from rose stems, expeditiously, and without danger to the hands of the operator.

In this specification, and the annexed drawings, the invention is illustrated in the form considered to be the best, but it is to be understood that the invention is not limited to such form, because it may be embodied in other forms, and it is also to be understood that in and by the claim following the description, it is desired to cover the invention in whatever form it may be embodied.

In the accompanying one sheet of drawing:

Figure 1 is a plan view of a pair of shears modified in accordance with this invention.

Fig. 2 is an end view of the same in detail, in cross-section on the line 11—11, Fig. 1.

Fig. 3 is a fragmentary detail of a conventional shear-blade having this invention applied thereto.

Fig. 4 is an end view of the same.

The removal of thorns from the stems of roses is fraught with great danger to the operator. Many serious and fatal cases of blood poisoning have resulted from the prick of rose thorns, due to the natural poison of the thorns often aggravated by the addition of Paris green and other poisonous solutions with which the roses are sprayed for the purpose of destroying parasites. Accidents of this character occur frequently among the florists and in the floral trades.

In detail, the construction illustrated in the drawings includes:

The handles 1 and 2, cross pivoted at 3, and terminating in the symmetrical crescent shaped jaws 4 and 5, overlapping and passing each other, preferably leaving the small aperture 6, when the handles are closed.

For convenience, and to avoid the multiplication of tools in the practice of this trade, the stripper may be provided with the shear jaws 7 and 8, having cutting edges 9, forming the conventional shear for snipping flower stems, in addition to the stripping jaws 4 and 5, all combined in the one instrument.

It is the function of the duplicate stripping jaws 4 and 5 to strip off the thorns and leaves from the stems of flowers. The stripper is operated substantially as follows: The rose stem is carefully grasped beyond the end the distance that it is desired to strip the thorns, the end X of the stem resting upon the table top, the stripping jaws 4 and 5 are then separated to pass the stem, then closed to confine the stem within the aperture 6, the closed jaws 4 and 5 are then moved up and down on the stem until the thorns and stamens are stripped off by the bluntly beveled edges 10 and 11 of the jaws 4 and 5. (See Fig. 2.) It is desirable that the cutting edges be set transversely to the plane of the jaws 4 and 5 and be left blunt and beveled back slightly so as not to scrape the bark from the stem confined within the aperture 6, while effectually removing the thorns and the leaves as indicated at $X^1$ and $X^2$ in Fig. 4; whereby the natural section of the stem is not destroyed and the blossom is properly nourished when the stems are placed in water.

A modification of the structure is illustrated in Fig. 3, in which the supplemental stripping jaws 12 and 13 are pivoted at 14 and 15 to the cutting jaws 16 and 17 of the conventional shear, whereby the supplemental jaws 12 and 13 may be turned back on their pivots 14 and 15, as indicated by dotted lines in Fig. 3, leaving the extreme ends of the jaws 16 and 17 unobstructed for the performance of their function in snipping or shearing the stems or leaves in preparing the flowers for decorative purposes.

For the purpose of holding the supplemental jaws 12 and 13 in the opposed position, as illustrated in Fig. 3 the lugs 18 are fixed in the shear blades 16 and 17 and adapted to engage holes 19 in the blades, the natural spring of the blades permitting the holes to cover the lugs 18 when the jaws 12 and 13 are swung on their respective pivots.

Other modifications within the purview of this invention will be manifest to those skilled in this art in adapting the invention to particular requirements.

Having thus described this invention, what I claim and desire to secure by Letters Patent is:

An improved hand flower shears such as described, including a pair of duplicate, opposed, cross pivoted shearing jaws in combination with duplicate, opposed extensions swivelly mounted on the outer end of each of the shearing jaws; curved gaps in juxtaposition, with relatively blunt cutting edges in each of said extensions; means for varying the distance between said curved gaps and a latch means for holding said extensions in operative position.

In testimony whereof, I have hereunto set my hand at San Francisco, California, this 2nd day of August, 1917.

FREDERIC J. BERTRAND.

In presence of—
A. J. HENRY,
LINCOLN JOHNSON.